United States Patent [19]

Hatton

[11] Patent Number: 4,974,775
[45] Date of Patent: Dec. 4, 1990

[54] LITTER BINS

[76] Inventor: Vaughan W. Hatton, Elbury Hall, Churston Ferrers, Brixham, Devon TQ5 0JW, England

[21] Appl. No.: 402,071
[22] Filed: Aug. 31, 1989

[30] Foreign Application Priority Data

Sep. 21, 1988 [GB] United Kingdom ............... 8822233

[51] Int. Cl.⁵ ............................................. B65D 91/00
[52] U.S. Cl. ................................ 232/43.1; 248/188.2
[58] Field of Search ................. 232/43.1, 43.2, 43.3; 220/1 T; 248/188.2, 188.3, 188.8

[56] References Cited

U.S. PATENT DOCUMENTS

| 2,974,352 | 3/1961 | Lockwood | 248/188.2 X |
| 3,166,782 | 1/1965 | Miller | 248/188.3 X |
| 3,394,832 | 7/1968 | McAllister et al. | 220/1 T |
| 3,904,218 | 9/1975 | Kostic | 220/1 T X |
| 4,577,778 | 3/1986 | Kim | 220/1 T X |

Primary Examiner—Robert W. Gibson, Jr.
Attorney, Agent, or Firm—Welsh & Katz, Ltd.

[57] ABSTRACT

A litter bin (1–5) and a support (32) for the litter bin is disclosed in which the support (32) is for attachment to a surface. One of the bin and the support has a spherically concave face and the other of the bin and the support has a complementary, spherically convex, face. There is means (40, 42, 45) for adjustably fixing the bin and the support together with the support attached to a surface, with the concave and convex faces opposite each other, so that the bin is in an upright disposition if the surface is sloping. The support has a tripod leg arrangement (35) which constitutes the sole means by which the support bears on the surface when the support is attached to the surface. Since the tripod leg arrangement is the sole means by which the support bears on the surface, the support will be steady once it is attached to the surface even if the surface is uneven.

8 Claims, 6 Drawing Sheets

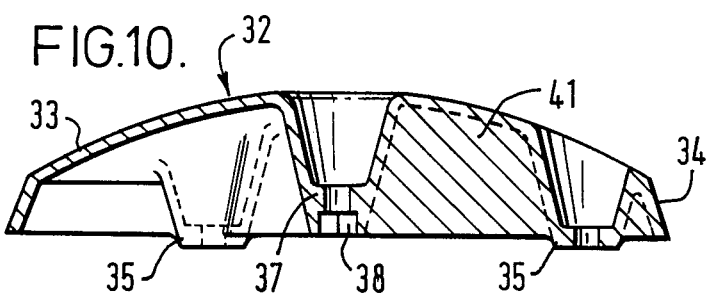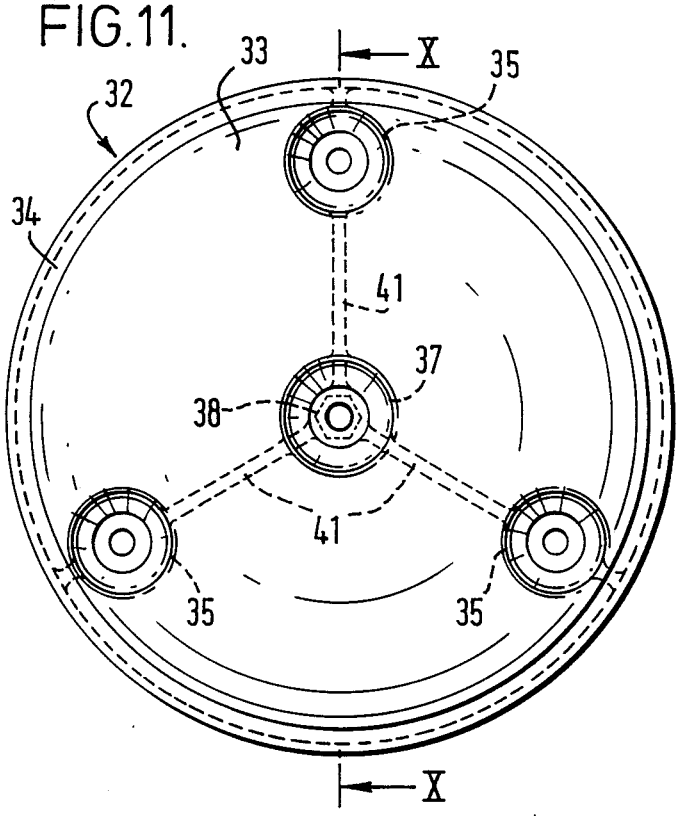

LITTER BINS

FIELD AND BACKGROUND OF THE INVENTION

This invention relates to litter bins.

In British Patent Specification No. 2 198 926 A there is disclosed a litter bin and a support for the litter bin, which support is for attachment to a surface, wherein one of the container and the support has a spherically concave surface and the other of the container and the support has a complementary, spherically convex, face, and means for adjustably fixing the container and the support together, with the support attached to a surface, with the faces opposite each other, so that the container is in an upright disposition if the surface is sloping.

The support disclosed in 2 198 926 has a circular peripheral rim, the bottom edge of which engages the ground. This presents a problem if the ground is uneven, for example cobblestones, since parts only of the rim may then contact the ground and the support may be unsteady, distort or fracture.

SUMMARY OF THE INVENTION

According to the present invention there is provided a litter bin and a support for the litter bin, which support is for attachment to a surface, wherein one of the bin and the support has a spherically concave face and the other of the bin and the support has a complementary, spherically convex, face, and means for adjustably fixing the bin and the support together with the support attached to a surface, with the faces opposite each other, so that the bin is in an upright disposition if the surface is sloping; the support having a tripod leg arrangement constituting the sole means by which the support bears on the surface when the support is attached to the surface. Since the tripod leg arrangement is the sole means by which the support bears on the surface, the support will be steady once it is attached to the surface even if the surface is uneven.

BRIEF DESCRIPTION OF THE DRAWINGS

The present invention will now be described, by way of example, with reference to the accompanying drawings, in which:

FIG. 10 is a sectional view of the support taken along line X—X of FIG. 11;
FIG. 11 is a plan view of the support.

DETAILED DESCRIPTION OF THE DRAWINGS

Figure 1:
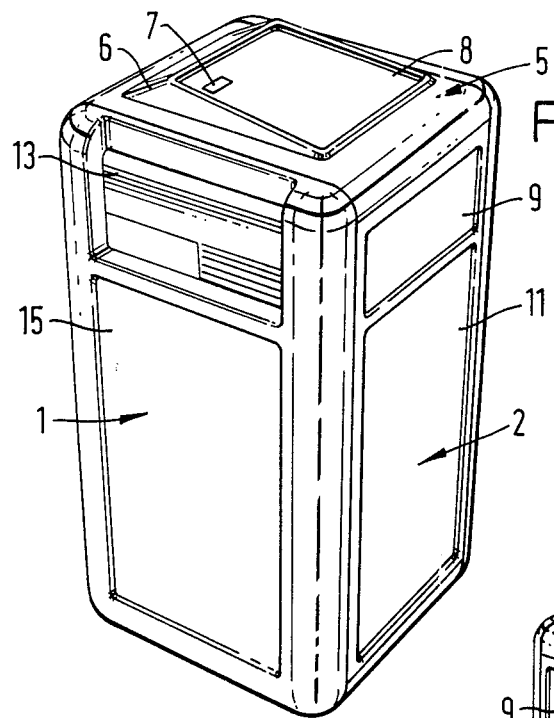
FIGS. 1 and 2 are perspective views of a litter bin.
Figure 2:
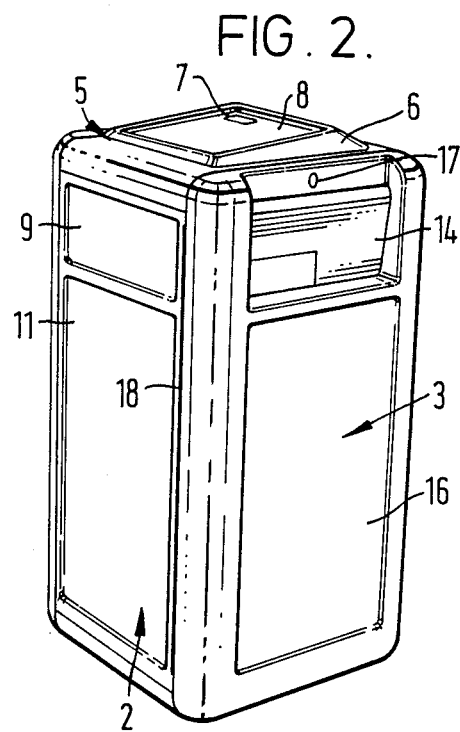
Figure 3:
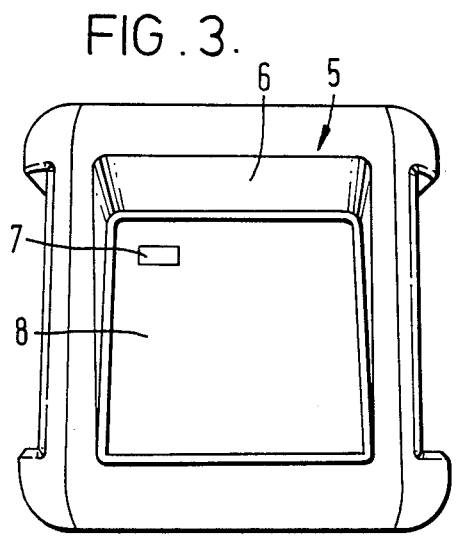
FIG. 3 is a view from above of the litter bin.
Figure 4:
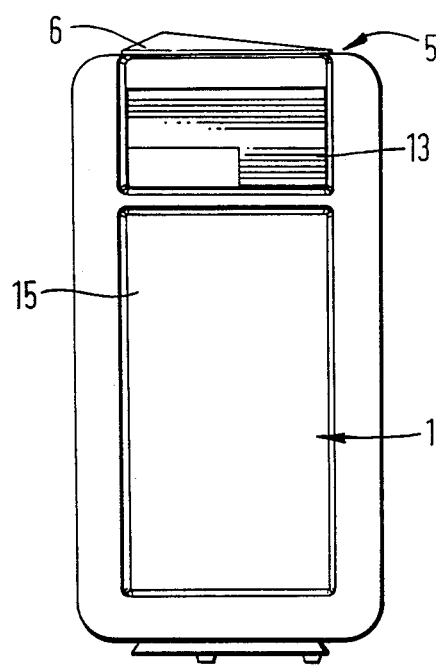
FIGS. 4, 5, 6 and 7 are side views of the litter bin.
Figure 5:
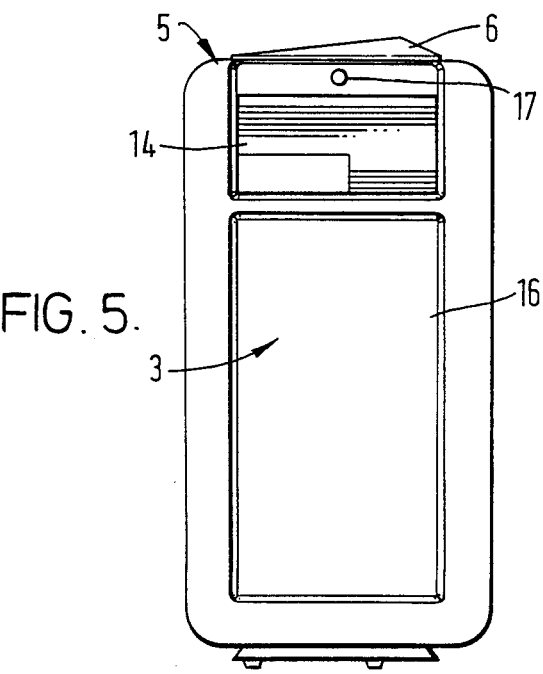
Figure 6:
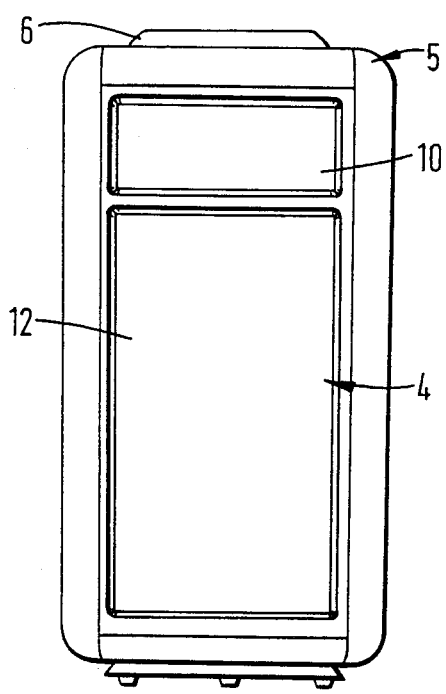
Figure 7:
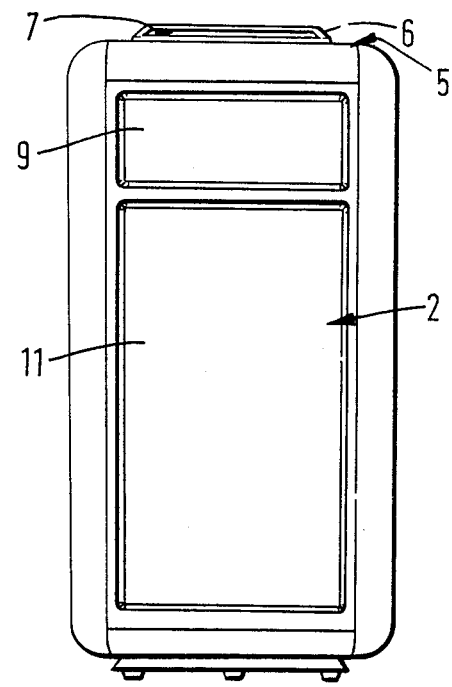

Referring first to FIGS. 1 to 7 of the drawings, the litter bin has a body of sheet steel or aluminum having four sides 1, 2, 3 and 4 and a top 5.

The top 5 is moulded to have a portion 6 sloping towards the side 2, the portion 6 including a digital clock having a display 7 revealed through an opening in a stainless steel or through a toughened glass panel 8, which panel may, for example, carry a street map.

The sides 2 and 4 have: portions 9 and 10 respectively, on which may be printed an indication of the road or street in which the litter bin is or other matter; and portions 11 and 12 respectively, below the portions 9 and 10 and which may carry, for example, advertising material.

In the side 1 there is an opening covered by a counter-balanced pivoted flap 13 and in the side 3 there is an opening covered by a counter-balanced pivoted flap 14, whereby litter may be inserted into the bin, the flaps 13 and 14 being of sheet steel or aluminum. Below the flaps 13 and 14 the sides 1 and 3 have portions 15 and 16 respectively which may carry, for example, advertising material. Above the flap 14 there is means 17 for receiving a key to unlock a locking pin, whereby the side 3 is released and may be pivoted outwards about a vertical hinge at 18 to enable litter t be removed from the bin.

Figure 8:
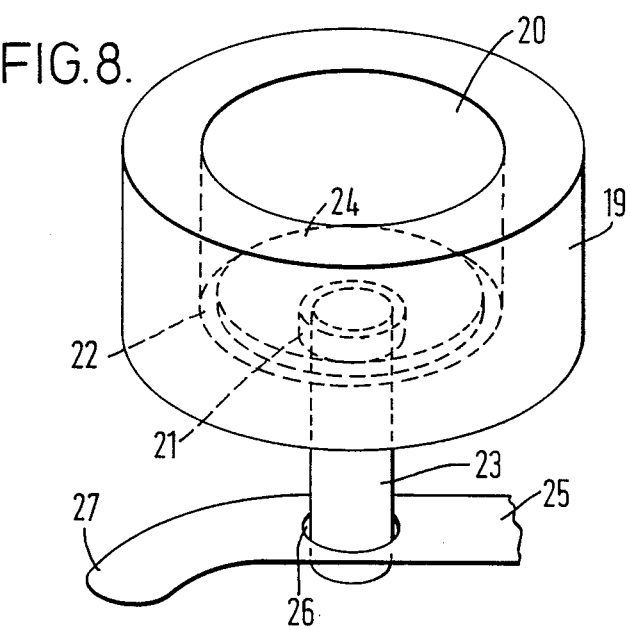
FIG. 8 shows a form of locking arrangement which may be used in the bin.
Figure 9:
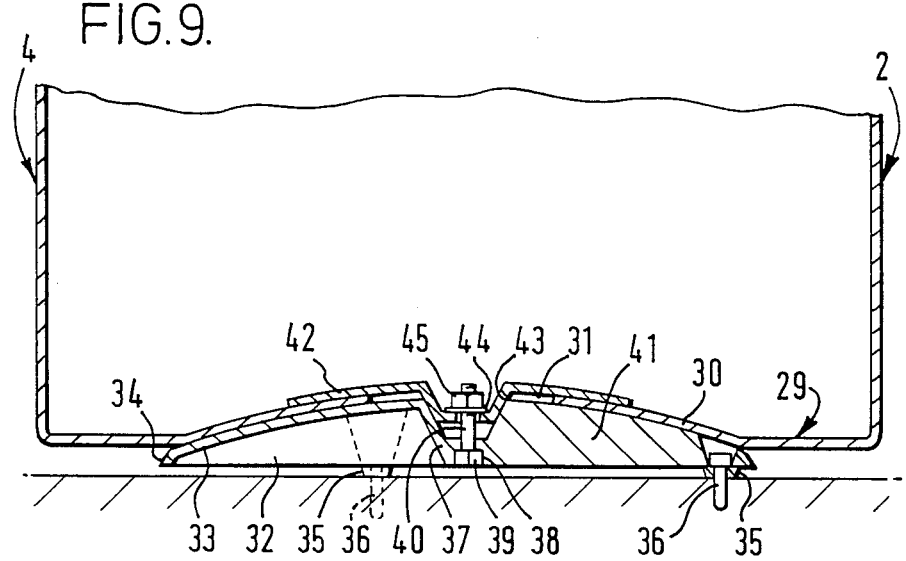
FIG. 9 is a sectional view through the bottom of the litter bin and a support to which the litter bin is secured.

As an alternative to locking means, locked and unlocked via a key, a locking arrangement as shown in FIG. 8 may be used. In FIG. 8, reference numeral 19 denotes a body having a first, relatively wide bore 20 which communicates with a second, relatively narrow bore 21 with a shoulder 22 in the body where the bores meet. The body 19 may be mounted with its bores vertical on the underside of the litter bin top 5, with the bore 21 lowermost. Received in the bore 21 is a plunger 23, retained in the body 19 by a larger diameter flat head 24 which rests on shoulder 22 when the plunger 23 is in its lowermost position. Carried by the side 3 on the inside of this side is a tongue 25 having a through-hole 26 and a downwardly sloping end portion 27. When the side 3 is closed from an open position, the plunger 23 rides up the portion 27 and drops into the hole 26 to lock the side 3 in position. As an alternative, the body 19 may be carried on the inside of side 3 and the tongue 25 under the top 5. The plunger 23 is of a magnetisable material and, from its locked position, the side 3 may be unlocked by bringing a permanent magnet, externally, adjacent the plunger 23 which may be lifted out of the hole 26 by moving the permanent magnet upwards. Alternatively, the plunger 23 may be in the form of a permanent magnet and be lifted out of the hole 26 using an external member of magnetisable material. Advantages of such a locking arrangement are that it is self-locking, it is "hidden", not being visible when the side 3 is locked in position, and avoids the need for a special key.

To enable the litter bin to be mounted in an upright or substantially vertical disposition on sloping ground (rather than having merely a flat bottom whereby it can only be mounted perpendicular to a sloping surface), the bottom of the bin is formed, and co-operates with a support, as will now be described with reference to FIGS. 9 to 12 and 12A. The base 29 of the bin is moulded to have a portion 30 which has a spherically concave outer face and is circular when viewed from above, the portion 30 having a central, circular opening 31. The portion 30 sits on a base support 32 of cast iron or cast aluminum, the support 32 being circular when viewed from above and having a portion 33 which has a spherically convex outer facing on which the portion 30 sits and which terminates in a circular rim 34. The support 32 is cast with three hollow legs 35 which depend from underneath the portion 33 to below the lower edge of the rim 34 and which receive bolts 36 that bolt the support 32 to the ground. The three legs 35 constitute a tripod leg arrangement. Since the legs 35 protrude beyond the lower edge of the rim 34, this tripod leg arrangement is the sole means by which the support bears on the ground and hence once the support is secured to the ground by the bolts 36 it will be steady even if the ground is uneven.

At the centre of the support 32 there is cast a hollow boss 37 in the base of which there is a recessed hexagonal socket 38 that receives, so as to be locked against rotation, the head 39 of a bolt 40. Radial stiffening webs 41 interconnect the central boss 37 to each of the hollow legs 35. The interior of the hollow boss 37 is open to the opening 31 in the portion 30.

To mount the litter bin, the support 32 is placed on the ground and is bolted to the ground by the bolts 36 passed through the legs 35. Once the support 32 is secured to the ground, the portion 30 of the base 29 of the bin is seated on the portion 33 of the support 32 with the bolt 40 passing through the opening 31, the head 39 of the bolt 40 being nested in the socket 38. The litter bin is pivoted on the support 32 to bring it to an upright or substantially vertical disposition even though the ground may be sloping. This adjustment is accommodated by the opening 31. To secure the bin to the support the concave face of a dished clamping disc 42 (which is circular when viewed from above and has spherically concave and convex opposite faces) is seated on to the inner (spherically convex) face of the portion 30, a central hollow boss 43 of the disc 42 being engaged in the hollow boss 37 of the support 32 with the bolt 40 passing through a central hole in the base of the boss 43. The disc 42 is of pressed steel or cast aluminum. A washer 44 is placed on the bolt 40 and a nut 45 is screwed on to the bolt 40 and tightened against the washer 44 to fasten the portion 30 to the support 32. Preferably, the bolt 40 has a "weakened" portion along that part of its length which is between the bosses 37 and 40, as a safety feature, so that it will snap if the bin is subjected to an impact greater than a certain level, allowing the bin to be knocked away from the support 32.

In an alternative construction, the portion 33 is spherically concave externally, the portion 30 being spherically convex externally.

If desired one or more countersunk self-tapping screws can be passed through suitable holes in the disc 42 and screwed into the portion 33 of the support 32 further to secure the bin to the support.

Figure 12:
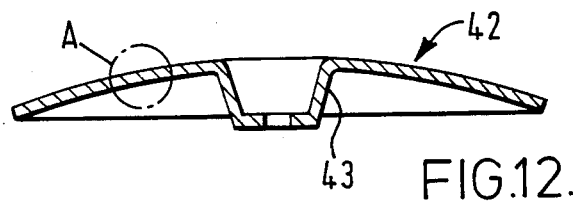
FIG. 12 is a sectional view of a clamping disc that is fitted at the bottom of the litter bin.
Figure 12A:
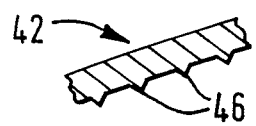
FIG. 12A is a detail view taken at A in FIG. 12.

As shown in FIG. 12A the under-surface of the disc 42 can be covered with raised pips 46 to improve the gripping action of the disc 42 on the portion 30.

Figure 13:
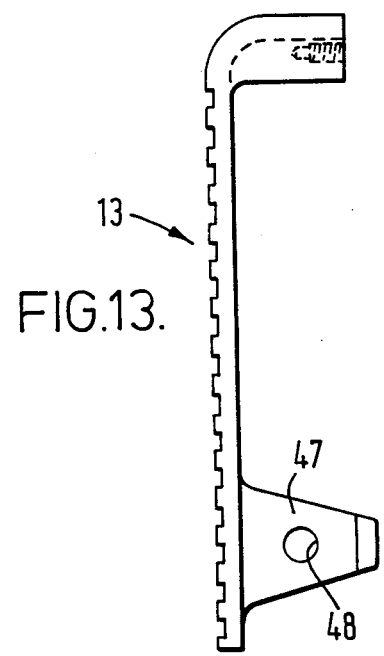
FIG. 13 is a side view of a flap of the litter bin.

Referring to FIG. 13, as shown in this Figure for the flap 13, each of the flaps 13, 14 carries an inwardly directed lug 47 through which there is a hole 48. When the flap is in its closed position the hole 48 is in line with a similar hole in a lug (not shown) carried by the bin body. Each of the flaps can be locked in its closed position by passing a suitable locking member through the aligned holes, access to set the locking device being achieved by opening the pivotable bin side 3. By locking the flaps closed, and subsequently locking the side 3 closed utilising the locking means therefor already described, the whole bin can be made secure in a closed condition. This feature is desirable where the bin is to be sited in an area in which security arrangements may require that street furniture such as litter bins should not be usable at certain times.

What is claimed is:

1. A litter bin and a support for the litter bin, which support is for attachment to a surface, wherein one of the bin and the support has a spherically concave face and the other of the bin and the support has a complementary, spherically convex, face, and means for adjustably fixing the bin and the support together with the support attached to a surface, with the faces opposite each other, so that the bin is in an upright disposition if the surface is sloping; the support having a tripod leg arrangement constituting the sole means by which the support bears on the surface when the support is attached to the surface.

2. A litter bin and support therefor as claimed in claim 1, wherein the tripod leg arrangement comprises three hollow legs which depend from underneath the support and which are for receiving bolts for bolting the support to the ground.

3. A litter bin and support therefor as claimed in claim 1, wherein the fixing means comprises a nut and bolt locked in a recessed hexagonal socket at the centre of the support and tightened to secure a dished clamping disc in overlying relationship with said concave and convex faces.

4. A litter bin and support therefor as claimed in claim 3, wherein the clamping disc has a central hollow boss engaged in a hollow boss of the support with the bolt passing through central holes in the bases of both these bosses.

5. A litter bin and support therefor as claimed in claim 4, wherein the bases of the bosses are spaced apart and the bolt has a weakened portion along that part of its length which is between the bases of the bosses so that the bolt will tend to snap at the weakened portion if the bin is subjected to an impact greater than a certain level, allowing the bin to be knocked away from the support.

6. A litter bin and support therefor as claimed in claim 4, wherein that surface of the clamping disc that is the clamping face of the disc is covered with raised pips to improve the gripping action of the disc.

7. A litter bin and support therefor as claimed in claim 1, wherein the bin has a side which may be opened and means for locking this side in its closed position, which locking means comprises: a plunger which is of magnetisable material or is in the form of a permanent magnet, and is carried inside the bin or on the inside of said side; and means carried on the inside of said side or inside the bin and having a hole for receiving the plunger.

8. A litter bin and support therefor as claimed in claim 7, wherein in each of two opposite sides of the bin there is an opening covered by a pivoted flap whereby litter may be inserted into the bin, each of these flaps carrying an inwardly directed lug through which there is a hole which, when the flap is in its closed position is in line with a similar hole in a lug carried by the body of the bin, each of the flaps being lockable in its closed position by passing a locking member through these aligned holes, access to set the locking device being achieved by opening the openable bin side.

* * * * *